US 9,348,925 B2

(12) United States Patent
Upstill et al.

(10) Patent No.: US 9,348,925 B2
(45) Date of Patent: May 24, 2016

(54) LOCALLY SIGNIFICANT SEARCH QUERIES

(75) Inventors: Trystan G. Upstill, Palo Alto, CA (US); Oleksandr Grushetskyy, Cupertino, CA (US); Andrei Damian, San Francisco, CA (US); Navneet Panda, Mountain View, CA (US); Aysel Ozgur, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1172 days.

(21) Appl. No.: 13/161,836

(22) Filed: Jun. 16, 2011

(65) Prior Publication Data
US 2014/0172843 A1   Jun. 19, 2014

Related U.S. Application Data

(60) Provisional application No. 61/418,506, filed on Dec. 1, 2010.

(51) Int. Cl.
*G06F 17/30* (2006.01)

(52) U.S. Cl.
CPC .................................. *G06F 17/3087* (2013.01)

(58) Field of Classification Search
CPC .................. G06F 17/30864; G06F 17/30867; G06F 17/30067; G06F 17/3087
USPC .................................................. 707/705, 724
See application file for complete search history.

(56) References Cited

U.S. PATENT DOCUMENTS

| | | | |
|---|---|---|---|
| 7,650,431 B2 | 1/2010 | Wang et al. | |
| 7,774,348 B2 * | 8/2010 | Delli Santi | G06F 17/3087 707/708 |
| 7,788,252 B2 * | 8/2010 | Delli Santi | G06Q 30/02 707/708 |
| 7,805,450 B2 * | 9/2010 | Delli Santi | G06F 17/30241 707/754 |
| 8,122,011 B1 * | 2/2012 | Garg | G06F 17/3064 707/721 |
| 8,195,653 B2 * | 6/2012 | Dandekar et al. | 707/724 |
| 8,200,694 B1 * | 6/2012 | Diligenti | G06F 17/3087 707/769 |
| 8,346,757 B1 * | 1/2013 | Lamping | G06F 17/30663 707/713 |
| 8,856,115 B1 * | 10/2014 | Huffman | G06F 17/3087 707/724 |
| 2005/0071741 A1 * | 3/2005 | Acharya | G06F 17/30864 715/208 |
| 2006/0085392 A1 * | 4/2006 | Wang | G06F 17/3087 |
| 2007/0112729 A1 * | 5/2007 | Wiseman | G06F 17/3087 |

(Continued)

OTHER PUBLICATIONS

Gan et al. ("Analysis of Geographic Queries in a Search Engine Log" dl.acm.org; 2008).*

(Continued)

*Primary Examiner* — Phuong Thao Cao
(74) *Attorney, Agent, or Firm* — Fish & Richardson P.C.

(57) ABSTRACT

Methods, systems, and apparatus, including computer programs encoded on a computer storage medium, for servicing search queries. In one aspect, a method includes determining that a general search query is a locally significant query for a user location that is associated with the user general search query. In turn, a local search query is generated using the general search query and a location phrase representing the user location. A set of set of general search results responsive to the general search query and a set of local search results responsive to the local search query are requested. A final set of search results responsive to the search query are selected. The final set of search results include at least one search result that is included in the set of local search results, and is not included in a pre-specified quantity of highest ranking search results from the set of general search results. Data that cause presentation of the final set of search results are provided.

17 Claims, 4 Drawing Sheets

(56) References Cited

U.S. PATENT DOCUMENTS

| | | | |
|---|---|---|---|
| 2008/0059508 A1* | 3/2008 | Lu | G06F 17/30707 |
| 2008/0077319 A1* | 3/2008 | Kato | G01C 21/3611 |
| | | | 701/532 |
| 2008/0097823 A1* | 4/2008 | Lapstun et al. | 705/10 |
| 2008/0167796 A1* | 7/2008 | Narayanaswami | G01C 21/362 |
| | | | 701/532 |
| 2008/0168033 A1* | 7/2008 | Ott | G06F 17/3087 |
| 2008/0172357 A1* | 7/2008 | Rechis | G06F 17/3087 |
| 2008/0222119 A1* | 9/2008 | Dai | G06F 17/3087 |
| 2008/0243611 A1* | 10/2008 | Delli Santi | G06Q 30/02 |
| | | | 705/14.64 |
| 2008/0243783 A1* | 10/2008 | Santi | G06F 17/30241 |
| 2008/0243821 A1* | 10/2008 | Delli Santi | G06F 17/3087 |
| 2008/0301112 A1* | 12/2008 | Wu | G06Q 30/02 |
| 2009/0019066 A1 | 1/2009 | Wang et al. | |
| 2009/0119285 A1* | 5/2009 | Sundaresan et al. | 707/5 |
| 2010/0082330 A1* | 4/2010 | Ankur | G01C 21/32 |
| | | | 704/8 |
| 2010/0174703 A1* | 7/2010 | Dandekar | G06F 17/3087 |
| | | | 707/722 |
| 2010/0211566 A1* | 8/2010 | Ghanekar | G06F 17/3087 |
| | | | 707/724 |
| 2011/0167125 A1* | 7/2011 | Achlioptas | G06F 17/30041 |
| | | | 709/206 |
| 2011/0184981 A1* | 7/2011 | Lu | G06F 17/3087 |
| | | | 707/774 |
| 2014/0358971 A1* | 12/2014 | Aminzade | G06F 17/3064 |
| | | | 707/780 |

OTHER PUBLICATIONS

Gan et al., "Analysis of Geographic Queries in a Search Engine Log", In Proceedings of LocWeb 2008, Apr. 22, 2008, Beijing, China, pp. 49-56.*

Lu et al., "Personalize Web Search Results with User's Location", In Proceedings of SIGIR' 10, Jul. 19-23, 2010, Geneva, Switzerland, pp. 763-764.*

* cited by examiner

LOCALLY SIGNIFICANT SEARCH QUERIES

CROSS-REFERENCE TO RELATED APPLICATIONS

This application claims the benefit under 35 U.S.C. §119(e) of U.S. Patent Application No. 61/418,506, entitled "LOCALLY SIGNIFICANT SEARCH QUERIES," filed Dec. 1, 2010, which is incorporated herein by reference in its entirety.

BACKGROUND

This specification relates to search query processing.

The Internet provides access to a wide variety of resources such as video or audio files, web pages for particular subjects, book articles, or news articles. A search system can identify resources in response to a text search query that includes one or more search phrases (i.e., one or more words). The search system ranks the resources based on their relevance to the search query and on measures of quality of the resources and provides search results that link to the identified resources. The search results are typically ordered for viewing according to the rank.

Some search systems can obtain or infer a location of a user device from which a search query was received and include local search results that are responsive to the search query. Local search results are search results that have been classified as having local significance to the particular location of the user device. For example, in response to a search query for "coffee shop," the search system may provide local search results that reference web pages for coffee shops near the location of the user device. Many users in various geographic regions will likely be satisfied with receiving local results for coffee shops in response to the search query "coffee shop" because it is likely that a user submitting the query "coffee shop" is interested in search results for local coffee shops.

However, there are some search queries that may have higher local significance in one geographic region than other geographic regions. For example, most users in the United States that submit the search query "mimosa" are likely to be satisfied receiving non-local search results, such as search results referencing informational web pages that describe mimosas. However, there may be a geographic region where the term "mimosa" has different local significance, such as referring to a local café. In this geographic region, users may be more interested in receiving a search result referencing the local café rather than search results referencing informational web pages about mimosa drinks in general. In these geographic regions, users may be more satisfied if the reference to café is included in the search results that are presented in response to the search query for "mimosa."

SUMMARY

In general, one innovative aspect of the subject matter described in this specification can be embodied in methods that include the actions of A method performed by data processing apparatus, the method comprising: receiving a general search query that does not include a location phrase, wherein a location phrase is one or more terms that specify a geographic location; detecting a user location that is associated with a user device for which the general search query was submitted; determining that the general search query is a locally significant query for the user location; creating a local search query using the general search query and a location phrase representing the user location; requesting a set of general search results responsive to the general search query and a set of local search results responsive to the local search query; selecting, from the set of general search results and the set of local search results, a final set of search results responsive to the search query, the final set of search results including at least one search result that is included in the set of local search results, and is not included in a pre-specified quantity of highest ranking search results from the set of general search results; providing data that cause presentation of the final set of search results. Other embodiments of this aspect include corresponding systems, apparatus, and computer programs, configured to perform the actions of the methods, encoded on computer storage devices.

These and other embodiments can each optionally include one or more of the following features. Determining that the general search query is a locally significant query for the user location can include determining that the general search query has been received from user devices associated with the user location at least a threshold number of times over a specified period. Determining that the general search query has been received from user devices associated with the user location at least a threshold number of times over a specified period can include: computing a local query count for a reference period, a local query count specifying a number of times that the general search query was received from user devices that are associated with the user location; computing a local query count for a specified period, the specified period being different than the reference period; and comparing the local query count for a specified period to the local query count for the reference period. Methods can further include determining that the local query count exceeds the expected query count by at least a threshold amount.

Determining a user location that is associated with a user device can include detecting a geographic identifier that specifies a geographic region for the user device that submitted the general search query. Creating a local search query using the general search query and a location phrase representing the user location can include creating a local query that includes the general search query and a location phrase that specifies the user location.

Creating a local search query using a general search query and a location phrase representing the user location can include: selecting, from a set of locally significant search queries for the user location, a locally significant search query that matches the general search query; and creating a local search query that includes the selected locally significant search query and the location phrase.

Selecting a final set of search results responsive to the search query can include selecting a pre-specified quantity of general search results to be presented in an available quantity of presentation positions of a search results page; and selecting local search results to be presented in a remaining quantity of presentation positions of the search results page.

Selecting a final set of search results responsive to the search query can include selecting, for inclusion in the final search results, local search results that have at least a minimum threshold click-through-rate when presented in response to the local search query. Selecting a final set of search results responsive to the search query can include: selecting, for inclusion in the final search results, general search results having result scores that exceed a result score threshold, wherein the result score threshold represents a minimum result score required for a search result to be presented in an initial search results page; selecting, for inclusion in the final search results, a local search result that has a result score for the local query that is higher than a result score for a general search result that has been selected to be included in the final search results; and removing, from the final search results, a general search result having a lowest result score.

Selecting a final set of search results responsive to the search query can include: selecting, for inclusion in the final search results, a first quantity of highest ranking general search results; selecting, for inclusion in the final search results, a second quantity of highest ranking local search results; and selecting a presentation order for the selected search results, the presentation order being selected according to result scores for the search results.

Determining that the general search query is a locally significant query for the user location can include determining that a map query rate for the general search query exceeds a threshold value, the map query rate for the general search query being a ratio of a quantity of map queries for the general search query relative to a total quantity of queries for the general search query, wherein the quantity of map queries for the general query specifies a number of times that the general search query was submitted through a map interface presenting the user location. The location phrase can be selected from a set of location phrases consisting of a city and a zip code.

Particular embodiments of the subject matter described in this specification can be implemented so as to realize one or more of the following advantages. A data processing apparatus can provide more relevant search results in response to receipt of a single general search query by providing local search results when the general search query is determined to be a locally significant search query for a particular user location. Users are provided information that has been determined to be relevant to their location in response to providing a general search query that does not include a location phrase. Thus, users that submit general search queries can receive local information without providing a local search query. A data processing apparatus can provide relevant data more efficiently by reducing the specificity of information requests (e.g., search queries) that are required to obtain the relevant data.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A final set of search results that include general search results (i.e., search results responsive to a general search query) and local search results (i.e., search results responsive to a local search query) are provided in response to a general search query. A general search query is a search query that, as originally submitted by a user at a user device, does not include a location phrase (e.g., a city, zip code, or other geographic identifier). A local search query is a search query that includes a location phrase (i.e., one or more terms that specify a geographic location) and/or another geographic identifier.

When a general search query is received, a user location of the user device that submitted the general search query is detected, and a determination is made whether the general search query is a locally significant query for the user location (e.g., whether the general query is received more often than expected from users from the user location). If the general search query is a locally significant search query, a local query is created using the general search query and the user location. For example, the local query can be created by appending the user location to the general search query. In turn, the general search query and the local search query are respectively used to request general search results and local search results. The final search results are selected from the requested search results.

Figure 1:
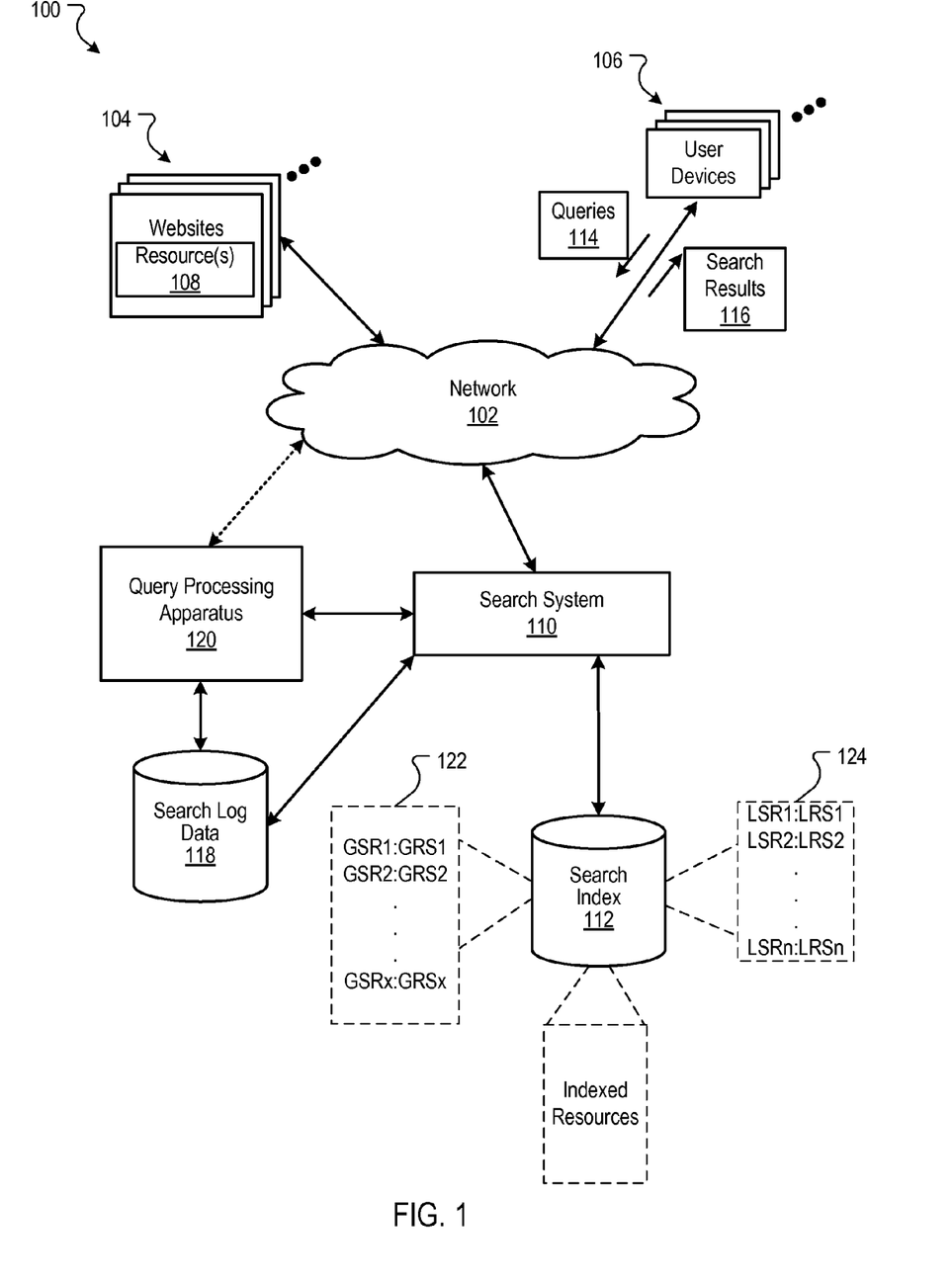
FIG. 1 is a block diagram of an example environment in which a search system provides search services.

FIG. 1 is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands publishers and user devices 106.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided by the web site 104 over the network 102 and that is associated with a resource address. Resources 108 include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 108, the search system 110 identifies the resources 108 by crawling and indexing the resources 108 provided by the publishers 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 109, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions (e.g., specified periods over which queries are received for user devices and search results are provided to the user devices in response to the queries) are stored in a data store such as the search log data store 118. Selection data specifying actions taken in response to search results 116 provided are also stored in association with (i.e., indexed according to) the search query in a data store such as the search log data store 118. These actions can include whether a search result was selected by a user. In some implementations, location data specifying a geographic location of the user device that submitted the search query can also be stored in association with the search query in the search log data store 118. The data stored in the search log data store 118 can be used to map search queries 114 submitted during search sessions to resources 108 that were identified in search results 116 and the actions taken by users.

Search results 116 are selected to be provided to a user device 106 in response to a search query 114 based on result scores. Result scores are scores that represent a measure of relevance of the resource 108 to a search query. For example, a result score for a resource 108 can be computed based on an information retrieval ("IR") score corresponding to the resource 108, a click-through-rate for search results that reference the resource, and/or a quality score of the resource 108 relative to other available resources. A presentation order for the search results 116 can be selected according to and/or using the result scores. In turn, data that cause presentation of the search results 116 according to the presentation order can be provided to the user device 106.

In some implementations, the relevance of resources to a particular search query can be determined, in part, through statistical analysis of search log data 118. Search log data are data that specifies search queries received from users and subsequent user selections (i.e., clicks) of particular search results. The search log data 118 can be anonymized so that the privacy of users is protected. For example, quasi-unique identifiers can be associated with users, but the actual identifying information of the users is not stored in the search log data 118. Additionally, any identified user preferences or user interactions can be generalized (for example, generalized based on user demographics) rather than associated with a particular user. Encryption and obfuscation techniques can also be used to protect the privacy of users.

The search log data 118 that is associated with a particular search query can be analyzed to determine which resources have been selected by users that submitted the search query, topics with which each of the resources is associated, and how many user selections are associated with each of the topics. Using this data, topics that are associated with at least a threshold portion of the user selections can be selected as being relevant to the search query. In turn, resources that are associated with the selected topics can be selected as resources that are relevant to the search query.

For example, search log data store 118 may specify that the search query "mimosa" was received from 1,000,000 users and that 700,000 of these users subsequently selected search results referencing web pages that provide recipes for or other information about different variations of a mimosa drink (i.e., are associated with the topic "mimosa drink"). The large percentage of total users that selected search results referencing web pages that provide information about the drink mimosa can be interpreted as a signal that web pages providing information about the mimosa drink (i.e., associated with the topic "mimosa drink") are generally considered relevant to users that provided the search query "mimosa." Because resources that are associated with the topic "mimosa drink" are generally considered relevant to the search query "mimosa," users, in general, may be satisfied with search results that present search results referencing these web pages about mimosa drinks near the top of the search results.

Although many users may be satisfied with the search results that are generated and presented as described above, using additional information can improve the quality of search results for particular users. For example, a particular user that is located in San Francisco, Calif. and submits the search query "mimosa" may actually be interested in information about "mimosa café," located in Oakland, Calif. or information about an event venue at which a local band having a name that includes the term "mimosa" is playing. However, the search results referencing "mimosa café" or referencing the event venue at which the band is playing may not be listed on the search results page that is presented in response to the search query "mimosa" when the statistical analysis described above is used. Thus, a user may be required to navigate to a second or subsequent search results page to see the search result for the café or the event venue.

Statistical analysis of search queries submitted by users from San Francisco may reveal that the search query "mimosa" is a locally significant query for San Francisco. A locally significant query is a query that is received more often from users in a particular location relative to users from a larger area. For example, assume that 1 out of every 1,000,000 queries received from users in the USA is for "mimosa," but that 100 out of every 1,000,000 queries received from San Francisco is for "mimosa." In this example, the search query "mimosa" can be classified as a locally significant query for San Francisco since "mimosa" is received 100 times more often from users in San Francisco than "mimosa" is received from users in the USA in general. Example techniques for classifying search queries as locally significant queries are described with reference to FIGS. 2A and 2B.

When a general search query is received often enough to be classified as a locally significant query, there may be a local attraction or other point of interest for which users in or near the locality are searching. Therefore, when a locally significant query is received from a user in the locale, user satisfaction can be increased when the search results provided in response to the search query include local search results on the initial search results page (i.e., a first search results page that is presented to the user following submission of the search query), as described below.

A local search result is a search result that is provided in response to a local search query. A local search query is a search query that, as submitted by a user, includes a location phrase and/or another geographic identifier. A location phrase is one or more terms that specify a geographic location (e.g., a zip code, an address, a city or a state). For example, the search query "Eiffel Tower Las Vegas" includes the location phrase "Las Vegas," such that the search query "Eiffel Tower Las Vegas" is a local query. The search query "Eiffel Tower," does not include a location phrase, and therefore, is a classified as a general search query.

Location phrases are resolvable to a non-ambiguous location, and therefore, do not include landmark phrases (i.e., phrases that specify a landmark). For example, the landmark phrase "Eiffel Tower" could refer to a replica of the Eiffel Tower that has been built in Las Vegas, or the Eiffel Tower that is located in Paris, France. Thus, the location that is represented (or inferred) from the phrase "Eiffel Tower" alone is ambiguous relative to location, and is not a location phrase. Similarly, the phrase "Statue of Liberty" alone is ambiguous relative to specifying a location because a replica of the Statue of Liberty has been built in Las Vegas such that the phrase "Statue of Liberty" could refer to at least two different locations.

The search system 110 includes a query processing apparatus 120 that is configured to provide a set of search results (i.e., a set of final search results) that are responsive to a general search query (i.e., a search query that does not include a location phrase) and include local search results in the set of search results when the general search query is a locally significant search query. In some implementations, the query processing apparatus 120 determines that the general search query is a locally significant query for geographic location of the user device that submitted the general search query by comparing the general search query to an indexed set of locally significant queries for the location in which the user device is located. The indexed set of locally significant queries can be created by the search system 110, query processing apparatus 120, or another data processing apparatus. The indexed set of locally significant queries can be generated, for example, using processes similar to those described with reference to FIGS. 2A and 2B, but other processes can also be used.

Once the query processing apparatus 120 has determined that the general query is a locally significant query for the location of the user device, the query processing apparatus 120 creates a local search query that includes the general search query and a location phrase that represents the user location. For example, assume that the user device is located in San Francisco and the general search query is "mimosa." In this example, the query processing apparatus generates the local query "mimosa San Francisco," using the general search query and the location of the user device. The data that specify the location of the user device can be anonymized so that the privacy of users is protected. For example, quasi-unique identifiers can be associated with locations, such that the actual location of the users is not stored. The data that specify the location of the user device can also be generalized (for example, to represent only a city or a state) rather than specifying the precise location of a particular user. Encryption and obfuscation techniques can also be used to protect the privacy of users. User identity can also be anonymized, as previously described, to protect user privacy.

Once the local query has been created, the query processing apparatus 120 can request (e.g., from the search system 110) search results that are responsive to each of the general search query and the local search query that was created. In response to the request the search system 110 selects a set of general search results 122 and a set of local search results 124 from the search index 112.

The general search results can be ranked (i.e., ordered) in the set of general search results 122, for example, according to general result scores that represent measures of relevance for resources referenced by the general search results to the general search query. For example, a highest ranked general search result (e.g., GSR1) can be associated with a highest general result score (e.g., GRS1). Each next lower ranked general search result (e.g., GSR2-GSRx) can be respectively associated with a next lower general result score (e.g., GRS2-GRSx).

Similarly, the local search results can be ranked in the set of local search results 124 according to local results scores that represent measures of relevance for resources referenced by the local search results to the local search query. For example, a highest ranked local search result (e.g., LSR1) can be associated with a highest local result score (e.g., LRS1). Each next lower ranked local search result (e.g., LSR2-LSRn) can be respectively associated with a next lower local result score (e.g., LRS2-LRSn).

The set of general search results 122 and the set of local search results 124 may each include a particular search result, such that there is overlap between the set of local search results 124 and the set of general search results 122. Although the particular search result is included in each of the general search results 122 and the local search results 124, the particular search result may be ranked higher in the set of local search results than it is in the set of general search results. For example, the particular search result may have a local result score that is the highest local result score among the local search results, while having a general result score that is the $30^{th}$ highest general result score among the general search results. Thus, the particular search result may be selected for presentation on a first search results page that is presented to a user in response to the local search query, while not being selected for presentation with a first search results page that is presented to a user in response to the general search query.

For example, a search result that references a web page for a Las Vegas restaurant that is located inside a replica of the Eiffel Tower may have a highest result score for the local search query "Eiffel Tower Las Vegas," such that this search result for the Las Vegas restaurant is selected for presentation with a first search results page provided in response to the local search query. However, the search result for the Las Vegas restaurant may not have one of a top threshold quantity of general result scores (e.g., top 10 general result scores) for the general search query "Eiffel Tower," such that the search result for the Las Vegas restaurant is not selected for presentation on a first search results page presented in response to the general search query "Eiffel Tower."

Using the local search results 124 and the general search results 122 that are received from the search system 110, the query processing apparatus 120 can select a final set of search results and provide data that cause presentation of the final set of search results at the user device. The final set of search results can be a pre-specified quantity of search results that are provided for presentation in response to a search query. The final set of search results can be, for example, the quantity of search results that are presented in a single search results page. For example, a final set of search results can include 10 search results when the search results page is configured to present 10 search results.

In some implementations, the query processing apparatus 120 can ensure that at least one search result that is included in the final set of search results is a local search result that is associated a general result score (for the general search query) that is lower than general result scores of the pre-specified quantity of highest ranking general search results in the set of general search results 122. For example, the query processing apparatus 120 can select a local search result that is associated with a highest local result score for inclusion in a set of ten final search results, even though the general result score for the search result is lower than 10 general search results.

Figure 2A:
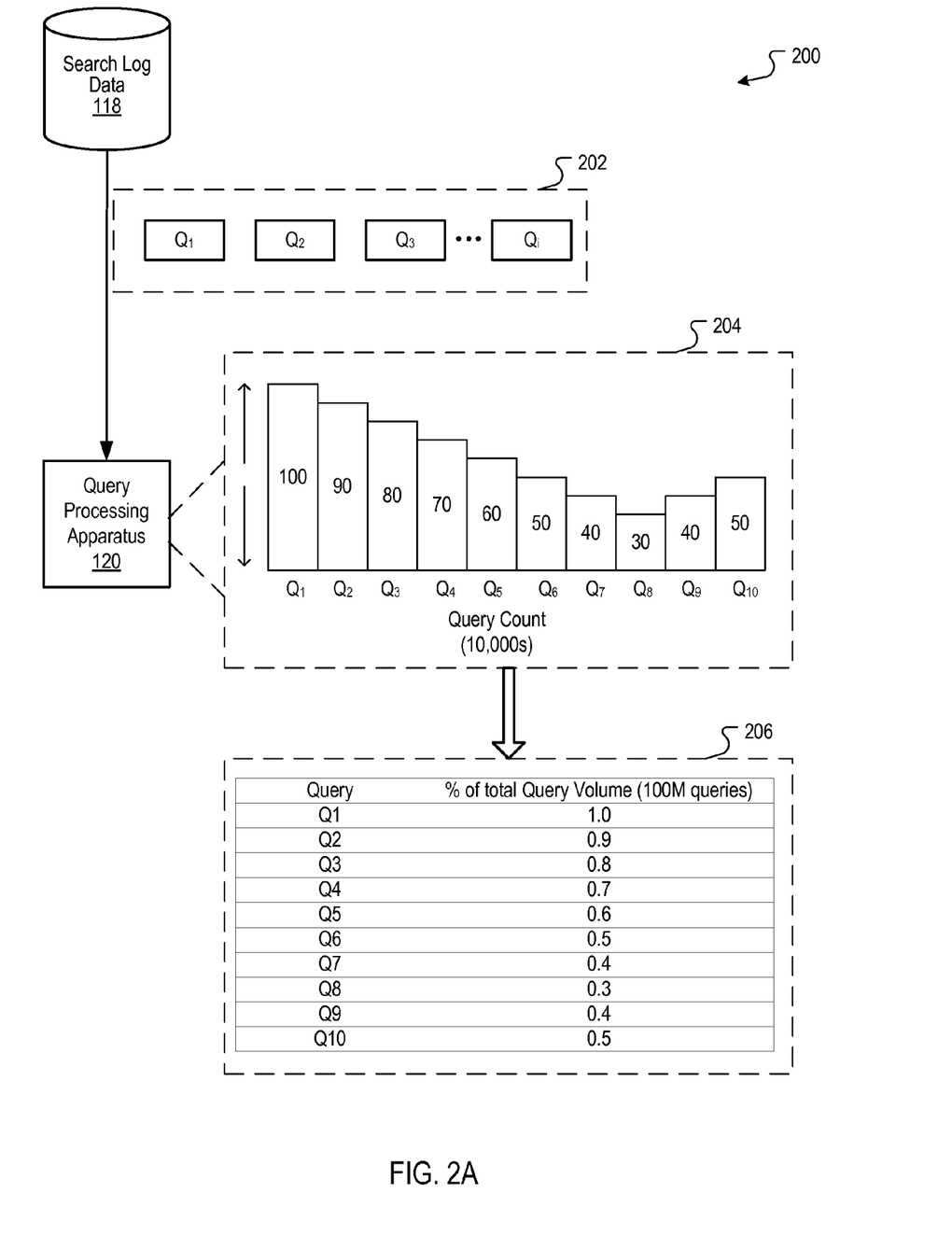
FIGS. 2A and 2B are block diagrams illustrating example data flows corresponding to classification of search queries as locally significant queries.
Figure 2B:
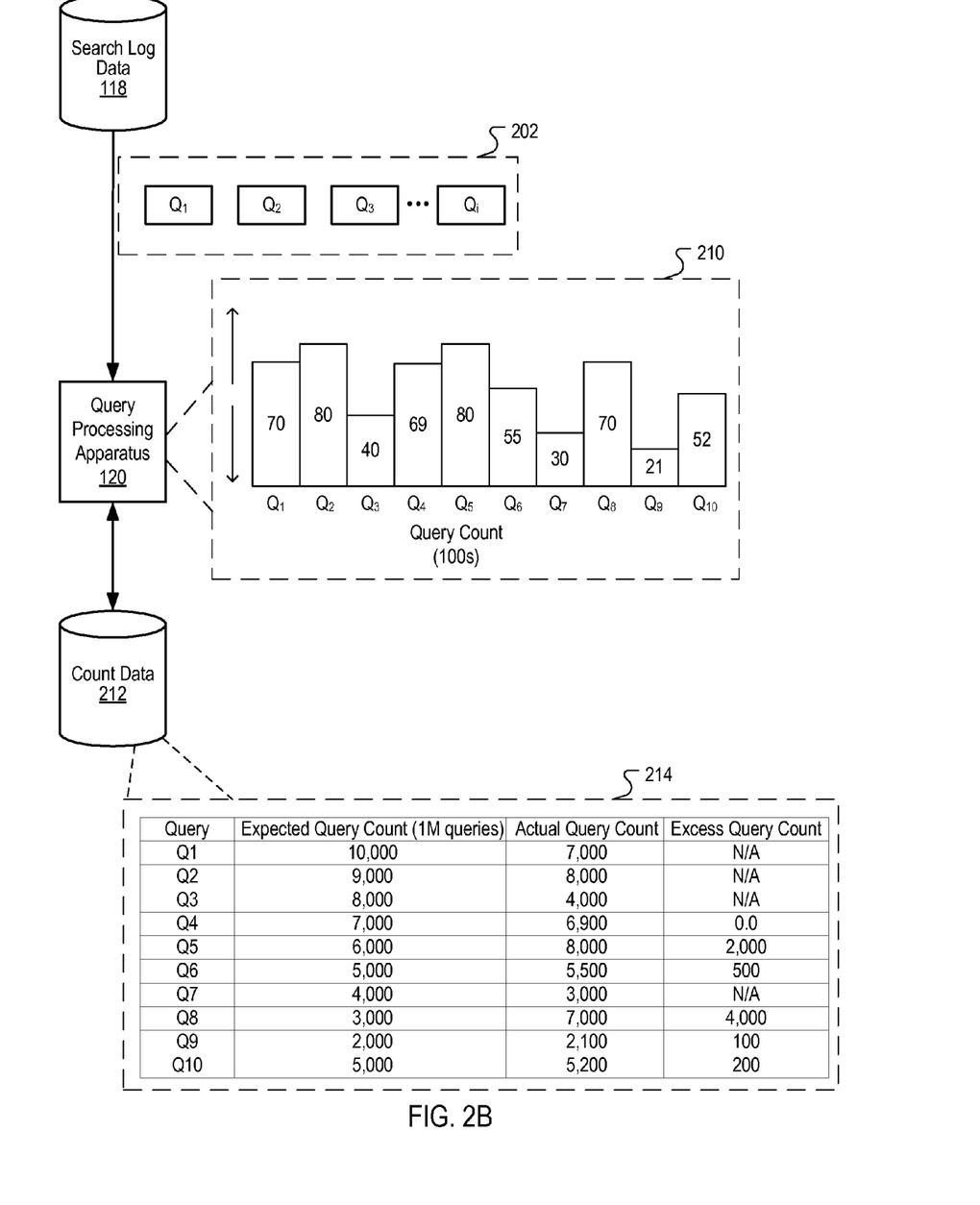

FIGS. 2A and 2B are block diagrams illustrating example data flows corresponding to classification of search queries as locally significant queries. FIGS. 2A and 2B are provided for purposes of example. Locally significant queries can be selected using other processes and other data flows.

The query processing apparatus 120 receives search log data 202 from the search log data store 118. As described above, search log data 202 can be anonymized so that the privacy of users is protected. Encryption and obfuscation techniques can also be used to protect the privacy of users.

The search log data 202 includes queries (Q1-Qi) that were received from users, and data specifying the locations from which the queries were received. In some implementations, the search log data 202 can include all queries that were received from users in a baseline (or reference) geographic region. For example, the search log data 202 can include search queries that were received from all users within the continental United States. Alternatively, the search log data 202 can be filtered to include only the queries that were received from users in a city or other geographic region of interest. In some implementations, the search log data 204 include only queries that were received from users at least a threshold a minimum number of times. For example, the queries included in the search log data 202 can include queries that were received at least a statistically relevant number of times (e.g., relative to a total number of queries received).

In some implementations, the search log data 202 received by the query analysis subsystem is a set of search queries that were received from users over a specified period. The specified period can be, for example, a specified amount of time or a specified number of events. For example, the search log data can include or specify search queries that were received from users over a previous calendar month (or year) or the past 100,000,000 search queries that have been received.

Search log data 202 that include search queries received, for example, over a past week or month can be used to identify more recent increases (i.e., spikes) for a particular query because the increase will be a more significant portion of the total number of queries in the search log data 202 than when the search log data 202 includes queries that were received over a longer time period. Conversely, search log data 202 that includes search queries over several months or years can be used to identify query counts that are less susceptible to change based on a temporary increase in search traffic. In some implementations, the search query data 202 includes search log data 202 that includes search queries received over a past year, and the query processing apparatus 120 filters the data to obtain subset of the search log data (e.g., search queries that were received over a past week or month).

The query processing apparatus 120 analyzes the search log data 202 to obtain a query distribution 204 for the search log data 202. A query distribution is a collection of search queries and a corresponding query count specifying number of times that the search queries were respectively received from user devices. In some implementations, the query distribution can be obtained using a subset of the search log data 202. For example, the query distribution can be obtained by selecting a threshold number queries that were received more often than the remaining queries. For illustrative purposes only, 10 queries are selected in FIG. 2A; however, thousands or even millions of queries could be selected for the query distribution. Alternatively, the query distribution could also include each query that was included in the search log data 202.

The query distribution 204 includes a reference to the ten queries and a corresponding number of times that each query was received from user devices over the specified period. For example, according to the query distribution 204, Q1 was received 1,000,000 times over the specified period while Q7 was received 400,000 times over the specified period.

Using the query distribution 204, the query processing apparatus 120 determines a set of query rates 206 that includes a query rate for each of the queries (Q1-Q10) in the distribution. A query rate for a query is a measure of the query count for the query relative to the total number of queries that were received. The total number of queries that were received can be, for example, a value representing each of the queries specified by the search log data that were received over a specified period. In some implementations, the query frequency for each query (Q1-Q10) can be computed as a ratio of the query count relative to the total number of queries (i.e., Query rate=Query Count/Total Queries received over specified period). For example, the query rate for Q1 has been computed to be 1.0% (i.e., 1,000,000/100,000,000), and the query rate for Q7 has been computed to be 0.4% (i.e., 400,000/100,000,000).

Referring now to FIG. 2B, the query processing apparatus 120 can also analyze the search query log 202 to identify search queries that were received from user devices located in a particular geographic region. As describe above, each query can be associated with a corresponding geographic identifier that specifies a location of the user device that submitted the query and the query analysis subsystem 120 can use these geographic identifiers to filter the search query data 202 to select only queries that were received from user devices in a particular geographic region.

In some implementations, the geographic identifier for each query can correspond to, or specify, a latitude/longitude pair representing the location of the user device that submitted the search query. The geographic identifier can also be a zip code corresponding to the location of the user device that submitted the query, a city in which the user device is located, or an area that is represented by a reference location and a specified distance from the reference location (e.g., a distance from a city center), or some other geographic identifier.

A geographic identifier for each query can be obtained based on user profile data provided by the user that explicitly specify the geographic location of the user. For example, registered users may provide their geographic location during a registration process. Thus, when a registered user is "logged in" and submits search queries, each query can be determined to be associated with the location specified in the user profile for the registered user. Therefore, the geographic identifier representing the location specified in the user profile can be associated with the search queries submitted by the user.

The geographic identifier for each query may also be determined using other data that may not be included in a user profile for a user, but are indicative of (or specify) a location of the user device from which the query was received. For example, an anonymized Internet Protocol (IP) address (e.g., a hash value computed using the IP address) corresponding to the user device can be used to obtain an estimated location of the user device (e.g., a state, city, or another geographic region). When the user device is a mobile device (e.g., cell phone, Personal Data Assistant, smart phone, or other portable data communications device) the location of the user device can also be provided by location-based services (e.g., GPS) that have been enabled for the phone. As described above, data specifying the location of a user can be anonymized, and encryption or other obfuscation techniques can also be used to protect the privacy of users. Additionally, the geographic location of the user can be generalized to a city or state level so as to not specify a precise location of a particular user.

The geographic identifier for a query can also be determined using search log data that is associated with the user device (i.e., stored at a memory location assigned to the user device and/or with a reference to the user device). In some implementations, the query processing apparatus 120 can parse the contents of search queries that were received from a same user device to determine the location of the user device. For example, the query processing apparatus 120 can parse the search query "mimosa San Francisco," to identify San Francisco as a location that is associated with the user device. Once locations have been extracted from queries provided by a particular user device, the query processing apparatus 120 can perform a statistical analysis of the quantities of search queries that included references to each of the locations. In turn, the query processing apparatus 120 can select a location of the user device with at least a threshold confidence (e.g., based on a location distribution), and assign an appropriate geographic identifier to search queries received from the user device.

In some implementations, the query processing apparatus 120 can assign a location confidence value to each search query (or each separate user device). The location confidence value specifies a likelihood that the geographic identifier for a search query has been accurately selected. For example, search queries that are associated with GPS data that explicitly specify a geographic location of a user device can be assigned a higher confidence score than search queries received from a user device for which the location of the user device was determined using an anonymized IP address associated with the user device or a location that was determined from a bimodal location distribution (e.g., that was generated using search log data.

The query processing apparatus 120 can use the confidence values to determine whether to use the query to identify locally significant queries. For example, the query processing apparatus 120 may identify locally significant queries using only those search queries that have a location confidence value that exceeds a pre-specified confidence threshold.

Using the geographic identifiers, the query analysis system can determine a total number of queries that have been received from user devices in the particular geographic region. For example, the query processing apparatus 120 can compute a sum of all queries received from user devices located in the particular geographic region over the specified period. The query processing apparatus 120 can also determine, for each search query received over the specified period, a local query count. A local query count is a value that represents a total number of times that queries were received from user devices in the particular geographic region. The query analysis subsystem 120 can compute, for the specified period, a total local query count that represents a total number of search queries that were received from user devices in the particular geographic region.

The local query counts for the queries can be used to obtain a local query distribution 210 that is a collection of queries received for a particular geographic region and corresponding numbers of times that the queries were each received from user devices in the particular geographic region. For example, the local query distribution 210 specifies that Q1 was received 7,000 times and that Q8 was received 8,000 times. The local query distribution 210 can be stored, for example, in a count data store 212. The local query counts obtained from the local query distribution 210 can be indexed, for example, based on the query to which they correspond. For example, table 214 lists the local query count for the queries (Q1-Q10) in the column titled "Actual Query Count."

The query processing apparatus 120 can use the total local query count for a particular geographic region to obtain an expected query count for each of the queries. In some implementations, the query processing apparatus 120 can obtain the expected query count for each query by multiplying the total local query count by the query rate that was computed for the query (i.e., (expected query count)=(total local query count)*(query rate)). For example, the expected query count for Q1 is computed to be 10,000 (i.e., 10,000=1,000,000*0.01) and the expected query count for Q8 is computed to be 7,000 (i.e., 7,000=1,000,000*0.007). The expected query counts for the queries can be stored, for example, in a count data store 212 and indexed based on the query to which the expected query counts correspond. For example, the table 214 lists the expected query counts for the queries (Q1-Q10) in the column titled "Expected Query Count."

The query processing apparatus 120 compares the local query counts for each of the queries to the corresponding expected query count for the query to determine whether the local query count for the query exceeds the expected query count. For example, comparing the local query counts to the expected query counts reveals that the local query counts for Q1-Q4 and Q7 fail to exceed the corresponding expected query counts for these queries, but that the local query counts for Q5, Q6, and Q8-Q10 do exceed the corresponding expected query counts for these queries. Thus, queries Q5, Q6, and Q8-Q10 from the particular geographic region were submitted in excess of what is expected. Thus these queries may qualify to be locally significant queries for the particular geographic region.

In some implementations, the query processing apparatus 120 can classify, as locally significant queries, any query having a local query count that exceeds the corresponding expected query count. In other implementations, the query processing apparatus 120 can require that a locally significant query be a query for which the local query count exceeds the corresponding expected query count by at least a threshold amount.

For example, the query processing apparatus 120 can require that the local query count exceed the expected query count by a specified percentage (e.g., 20%) or by an absolute number (e.g., 1,000). The query processing apparatus 120 can also require that each query that is classified as a local query be one of N queries (e.g., 10, 100 or 1,000 queries) having local query counts that exceed the corresponding expected query counts by the highest amounts. Assuming that the query processing apparatus 120 requires locally significant queries to have a local query count that exceeds the expected query count by at least 40%, Q5 and Q8 would qualify as locally significant queries for the particular geographic region and can be indexed as such. Thus, in response to receiving a general search query that is identified as being received from a user device in the particular geographic region and matches either Q5 or Q8, the query analysis subsystem 120 can create a local query using the general search query and a location phrase specifying the particular geographic region.

As described above, locally significant queries are queries that are received from users in a particular geographic region (e.g., a city) more often than expected based on rates with which the search queries are received from users across a larger geographic region (e.g., a country). Locally significant queries can also be selected in response to detecting a rate spike for a query in a particular geographic region from one time period to another. For example, assume that the query rate for the search query "mimosa" during a first time period (e.g. a one month period) is 0.1% of all queries received from users in San Francisco. Further assume that the query rate for "mimosa" during a second time period (e.g., the month following the first time period) is 0.4% of all queries received from users in San Francisco. In this example, the query rate for "mimosa" has increased by a multiple of four over a single time period. This sharp increase in query rate for "mimosa" in San Francisco can be a signal that there is a local event or another attraction in which users from San Francisco are gaining interest. Therefore, identifying "mimosa" as a locally significant query based on this increased query rate may be justified. In some implementations, locally significant queries can be those queries for which an increase in query rate from one period to another period exceeds a minimum specified threshold increase (e.g., 50% period to period increase).

In some implementations, locally significant queries can also be selected based on a map query rate for the search query. A map query rate is a ratio of a quantity of map queries for a general search query relative to a total quantity of search queries for the general search query. A map query is a search query that is submitted through a map interface (i.e., a search interface that is presented with an online map display). A quantity of map queries for a particular geographic region can be a number of times that the general search query was submitted through a map interface that was presenting the particular geographic location. For example, quantity of map queries for the search query "mimosa" that are associated with San Francisco can be a number of times that "mimosa" was received through a map interface that was presenting a map displaying San Francisco.

The local significance of a search query can vary, for example, based on the geographic region considered when determining the expected query count. For example, "mimosa" may be a locally significant query for the city of San Francisco (e.g., based on the query count for "mimosa" from users in San Francisco exceeding the expected query count by at least a threshold amount), but may not be a locally significant query for the state of California (e.g., based on the query count for "mimosa" from users in California not exceeding the expected query count by at least a threshold amount). Thus, the determination of whether a search query is a locally significant query can depend on the geographic region being considered.

In some implementations, the local significance of a query can be iteratively determined for various different geographic regions that each includes a same particular location. For example, the local significance of a particular search query can be determined on a per-town, per-county, per-state, and per-country basis.

In some implementations, a geographic region that is considered for determining local significance (e.g., for determining an expected query count) can be selected in view geographic data specifying geographic features for a particular geographic region and/or an analysis of the query itself. For example, if mountains, country borders, rivers, lakes, and/or other obstacles separate portions of a geographic region from which search queries were received, these obstacles can be used to define separate geographic regions for which local significance is determined.

Additionally, the geographic region considered for determining local significance of a search query can be selected based on a type of search query that is received. For example, a search query that includes the word "pizza" is likely a search query for which local significance should be analyzed on a per-city basis, whereas a search query that includes "tax" is likely to be a search query for which local significance should be analyzed on a per-state basis.

Figure 3:
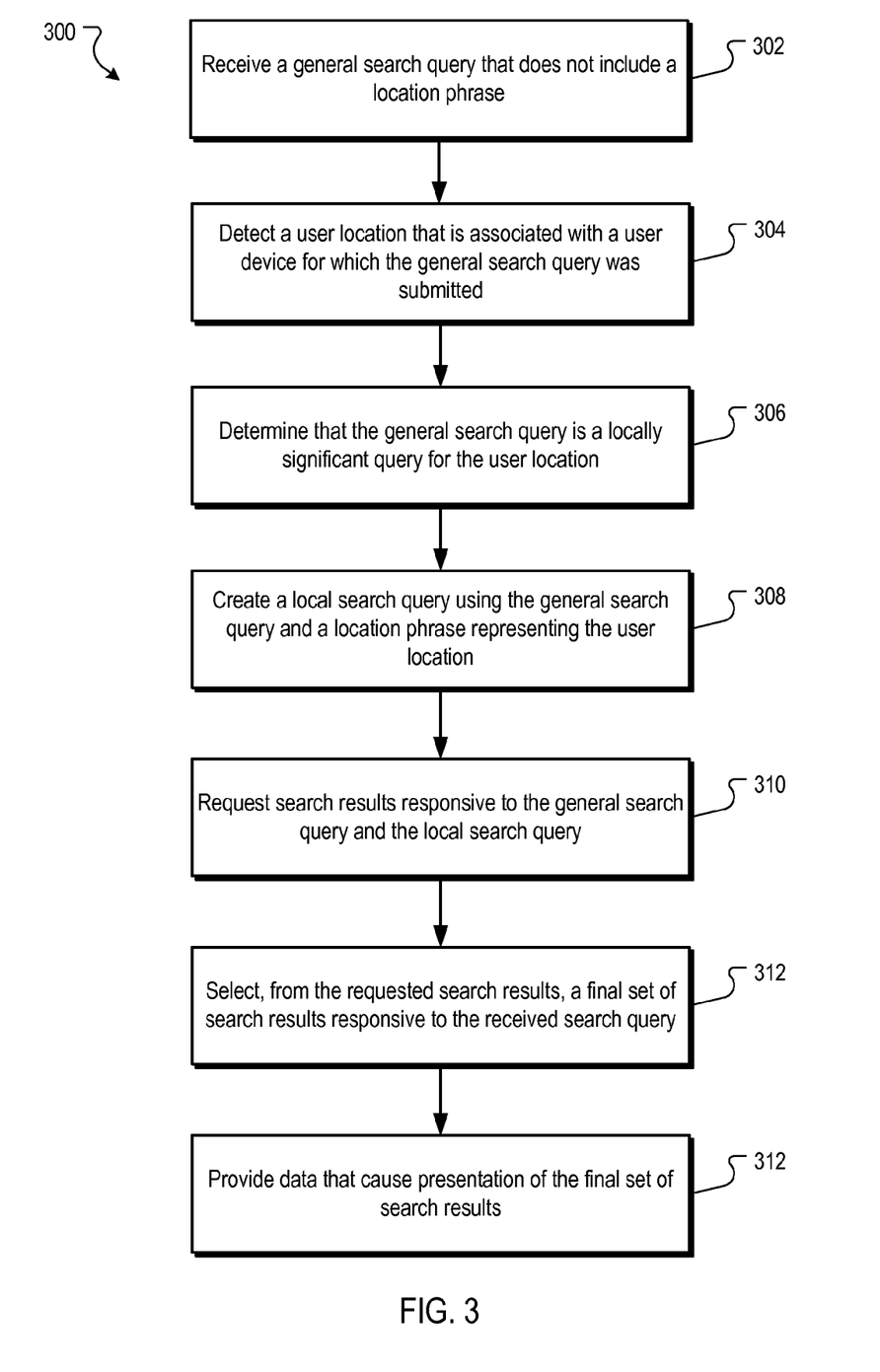
FIG. 3 is a flow chart of an example process for providing search results responsive to a general search query that is determined to be a locally significant query.

FIG. 3 is a flow chart of an example process 300 for providing search results responsive to a general search query that is determined to be a locally significant query. The process 300 is a process by which a determination is made that the general search query is a locally significant query for a user location that is associated with the general search query. In turn, a local search query is created using the general search query and the user location and search results responsive to each of the general search query and the local search query are requested. A final set of search results are selected from search results provided in response to the request and data that cause presentation of the final set of search results.

The process 300 can be implemented, for example, by the query processing apparatus 120 and/or the search system 110 of FIG. 1. In some implementations, the query processing apparatus 120 is a data processing apparatus that includes one or more processors that are configured to perform actions of the process 300. In other implementations, a computer readable medium can include instructions that when executed by a computer cause the computer to perform actions of the process 300.

A general search query that does not include a location phrase is received (302). As described above, a location phrase is one or more terms that specify a geographic location for a search query. A location phrase can be a city name, a zip code, a latitude/longitude coordinate pair, or another identifier of geographic location (i.e., a geographic identifier). Thus, a general search query that does not include a location phrase can include, for example, search queries such as "football team," "mimosa," "music artist," or other phrases that do not include a geographic identifier.

Search queries that include location phrases can search queries with which location phrases are included when the search query is receive from the user device, or search queries to which a location phrase was appended, for example, by a search system or a query processing system. As described in more detail below, location phrases that match a geographic identifier for a particular geographic region can be used to select search results that are associated with the particular geographic location. Location phrases can match a geographic identifier for a particular geographic location by including a phrase that is an exact match of the geographic identifier. For example, if the geographic identifier for the particular geographic region is a city name (e.g., Atlanta, Ga.), a matching location phrase will include the same city name (e.g., Atlanta, Ga.).

Location phrases can also match a geographic identifier for particular geographic location by having a geographic identifier that includes any reference to the particular geographic region (e.g., zip code) or includes a reference to a location that is within a specified distance of a the particular geographic region. For example, if the particular geographic location includes the city of San Francisco and all areas within 50 miles of the center of San Francisco, then geographic identifiers for queries that reference the city of San Francisco (e.g., zip code 94131), or locations within 50 miles of the city of San Francisco, (e.g., Oakland, Calif.), will match the geographic identifier for the San Francisco region.

A user location that is associated with a user device for which the general search query was submitted is detected (304). In some implementations, a user location that is associated with a user device can be detected based on user device data that is provided with the search query. For example, a user location associated with a particular search query can be detected using user profile data provided by the user and/or an anonymized Internet Protocol (IP) address (e.g., a hash value computed using the IP address) corresponding to the user device. When the user device is a mobile device (e.g., cell phone, Personal Data Assistant, smart phone, or other portable data communications device) the user location can also be provided by location-based services (e.g., GPS) that have been enabled for the mobile device.

A determination is made that the general search query is a locally significant query for the user location (306). The general search query can be determined to be a locally significant query when the general search query matches a search query that has been indexed as a locally significant query for the user location. For example, a set of locally significant queries for the user location can be stored in a data store. When the general search query is received from the user location, the general search query can be compared to the set of locally significant queries. If the general search query is determined to match a search query in the set of locally significant queries, the determination is made that the general search query is a locally significant query for the user location.

In some implementations, the set of locally significant queries for a user location includes general search queries that have been received from user devices associated with the user location at least a threshold number of times over a specified period. The threshold number of times that a general search query is required to be received can be specified as an absolute value (e.g., 100,000 times), as a portion of all queries from the user location (e.g., 10% of all queries), or based on a query distribution as described with respect to FIGS. 2A and 2B.

When a query distribution is used to determine whether the general search query is a locally significant query, a local query count is computed for the general search query. The local query count that is computed specifies a number of times that the general search query was received from user devices that are associated with the user location. For example, the local query count can be a value representing a number of user devices that submitted a query matching the general search query and were identified as being associated with a same (or matching) geographic identifier as the user device that provided the general search query.

A general search query can match a local query by having the same text as the local query. For example, if the local query is "football," then the search query can match the local query by including the text "football." In other implementations, related variations of the query "football" that have at least a minimum specified similarity (e.g., synonyms, plurals, stubs, or other related terms) can also match the local query "football." Additionally, queries that have been identified to return similar search results as the local query "football" can also match the local query "football" (e.g., using data clustering techniques). Thus, a query count for a particular search query may include instances of search queries that were received and matched the search query without being exactly the same as the particular search query.

Once the local query count has been computed, the local query count is compared to an expected query count that represents a number of times that the general search query is expected to be received from user devices that are associated with the user location (e.g., have geographic identifiers that match a geographic identifier for the user location). As described above with reference to FIGS. 2A and 2B, the expected query count can be computed using a query distribution for queries that were received from user devices in a baseline geographic region that includes the user location, but also includes other user locations that are considered different user locations. For example, each user location can represent a city, set of zip codes, or a state, while the baseline geographic region can include the entire continental United States. Alternatively, the local query count for one particular specified time period (e.g., a most recent month) can be compared to the local query count for another specified time period (e.g., a month prior to the most recent month). As described with reference to FIG. 2B, the difference between the local query counts for the two different time periods can be used to determine whether the general search query is locally significant.

In some implementations, a determination that a general search query is a locally significant query can require that the local query count exceed the expected query count by at least a threshold amount. The threshold amount can be specified, for example, as an absolute number (e.g., 10,000) or a portion of the expected query count (e.g., 110% of the expected query count). As described with reference to FIG. 2A, the queries with which the local query count and query distribution are computed can include all search queries that have been received. Alternatively, the queries used to compute the local query count and query distribution can be a set of queries that were received during a specified time period (e.g., over a previous month or year).

In some implementations, a search query can be determined to be a locally significant query for a user location when a map query rate (or mobile device query rate) for the general search query exceeds a threshold value. For example, if the threshold value is set to 0.40, a general search query that has a map query rate (or mobile query rate) of 0.50 for a particular user location (i.e., geographic area) will be determined to be a locally significant query for the particular user location. As described above, the map query rate is a ratio of a quantity of map queries for a general search query relative to a total quantity of search queries for the general search query. Similarly, a mobile device query rate is a ratio of a quantity of mobile device queries (i.e., queries submitted by mobile devices) for a general search query relative to a total quantity of search queries for the general search query A local search query is created using the general search query and a location phrase that represents the user location (308). In some implementations, the local search query is created by creating a search query that includes the general search query (or a portion thereof) and a location phrase. For example, the local search query "mimosa San Francisco" can be created in response to receipt of the general search query "mimosa" that was received from a user device that is determined to be in "San Francisco." Similarly, the local search query "mimosa 94131" can be generated for the same user because 94131 is a zip code for San Francisco.

In some implementations, the local search query can be created by using the location phrase for the user location and a locally significant search query that matches the general search query. As described above, two phrases (e.g., search queries) that are not the same can still be determined to be similar enough (e.g., satisfy a similarity threshold using cosine similarity measures or other measures of similarity for the two phrases) that the two phrases are considered to match.

A locally significant query for the user location that matches the general search query can be selected from a set of locally significant queries for the user location. For example, using measures of similarity, a locally significant query that has a highest (or at least a threshold) measure of similarity with the general search query. In some implementations, more than one locally significant query that matches the general search query can be selected to create multiple local queries. For example, each locally significant query that is determined to match the general search query (e.g., has at least a minimum specified similarity measure) can be used to create a separate local query.

Search results responsive to the general search query and the local search query are requested (310). The request for search results includes a request for a set of general search results that are responsive to the general search query and a request for search results that are responsive to the local search query. In some implementations, the request for general search results and local search results can be provide to and processed by a single search system and/or data store that stores both general and local search results.

In other implementations, the set of general search results are requested from a search system and/or a data store that stores a set of general search results that have been indexed as being responsive to the general search query. In these implementations, the set of local search results can be requested from a same or different search system and/or from a data store that stores a set of search results that have been indexed as local search results for a geographic region that is represented by the location phrase. For example, assuming that the local search query includes the location phrase "San Francisco," the local search results can be requested from a data store storing search results that have been indexed as local search results for San Francisco.

A final set of search results that are responsive to the received search query are selected from the requested search results (312). In some implementations, the final set of search results include at least one search result that is included in the set of local search results, but is not included in a pre-specified quantity of highest ranking search results from the set of general search results. For example, assume that the set of general search results for the general search query "mimosa" include search results related to the drink mimosa and other resources that have a result score indicating that the general search results are relevant to the general search query "mimosa." Also assume that a search result for a resource that provides information about café mimosa in Oakland is not one of the 20 highest ranking search results in the set of general search results, but is included in the set of local search results. In this example, the final set of search results can include the search result for mimosa café and the search results that are included in the general set of search results.

In some implementations, the final set of search results can be selected by selecting a pre-specified quantity of general search results to be presented in an available quantity of presentation positions of a search results page. In these implementations, the final set of search results can selected on per page basis. For example, the final set of search results can be independently selected for the first search results page that will be presented by the user device, and each subsequent search results page. Assuming that each search results page includes 20 available presentation positions at which search results are presented, the pre-specified quantity of general search results can be up to 19 general search results, and local search queries can be selected to be presented in a quantity of remaining presentation positions (i.e., quantity of remaining presentation positions=presentation positions−pre-specified quantity of general search queries).

Local search results that are selected for inclusion in the final set of search results can be local search results that have at least a minimum threshold click-through-rate when presented in response to the local search query. The minimum threshold click-through-rate can be specified as an absolute value (e.g., 0.02 click-through-rate) or a click-through-rate value that limits selection of local search results to local search results having click-through-rates that are in a top specified percentage (e.g., 10%) of click-through-rates for local search results in the set of local search results.

In some implementations, the final set of search results are selected using result scores of the general and local search results. In these implementations, the general search results having result scores that exceed a result score threshold can be selected for inclusion in the final search results. The result score threshold represents a minimum result score that is requires for a search result to be presented in a particular search results page. For example, when selecting a final set of search results for an initial search results page (i.e., a search results page that is first presented in response to a search query), the result score threshold can be set a value that delineates general search results with the highest 20 result scores from the remaining search results in the set of general search results. The quantity of general search results that are selected for inclusion in the final set of search results can be equal to or less than a total number of presentation positions that are available to present search results.

Once the general search results have been selected, one or more local search results can be selected for inclusion in the final search results. A local search result that is selected for inclusion in the final search results can be a search result having a result score for the localized query that is higher than a result score (for the general search query) for a general search result that has been selected for inclusion in the final set of search results. For example, assuming that 20 general search results have been selected for inclusion in the 20 presentation positions that are available to present the final set of search results on an initial search results page, the local search result that is selected for inclusion in the final set of search results will have a local result score (i.e., a result score for a local search query) that exceeds a general result score (i.e., a result score for a general search query) at least 1 of the 20 general search results.

In implementations, where a number of general search results that are selected for inclusion in the final set of search results is equal to (or exceeds) the quantity of available presentation positions for presenting search results, a general search result is removed from the set of final search results in response to selecting a local search result for inclusion in the set of final search results. The general search result that is removed will generally be the general search result having a lowest result score among the general search results that were selected for inclusion in the final set of search results.

For example, assume that 20 general search results are initially selected for inclusion in the final set of search results and there are 20 presentation positions available in an initial search results page. In this example, when a local search result is selected for inclusion in the final set of search results, one of the general search results is removed from the set of final search results. Assuming that that the 20 general search results each have different general result scores ranging from 0.90-0.50, and that that the local search result has a local result score of 0.70, the general search result score associated with the 0.50 result score will be removed from the final set of search results and the final set of search results will include 19 general search results and 1 local search result.

Data that cause presentation of the final set of search results are provided (314). The data that are provided can cause presentation of the search results at presentation positions according to a presentation order. The presentation order specifies a relative presentation position for each search result relative to the other search results that have been selected for presentation. For example, the presentation order can specify that a search result having a highest result score is presented in a more prominent presentation location of the search results page than the other search results and that each next highest scoring search result (e.g., based on the result scores) be respectively presented in a next most prominent presentation location.

The prominence of a presentation position can be determined, for example, based on previous performance (e.g., click-through-rate) of content that has been presented in the presentation position. For example, presentation positions for which an average click-through-rate of advertisements is highest can be a most prominent presentation position, with each remaining presentation position having its prominence specified according to the average click-through-rate of advertisements that have been presented in the presentation position. In some implementations, the prominence of a presentation position can be determined, at least in part, on a portion of the presentation position that is visible on initial display of a page by a user device.

In some implementations, the presentation order for the search results is selected based on the values of the result scores irrespective of whether the result scores are general result scores or local result scores. In other implementations, the presentation order is selected based on the result scores for the search results and whether the result score is a general result score or a local result score. For example, a top 5 most prominent presentation positions can be reserved for general search results, while the remaining 15 positions can be used to present either general search results or local search results. In this example, the highest presentation position that can be used to present a local search results is the $6^{th}$ most prominent presentation position, even if the local search result has a local result score that exceeds the general result scores of all of the general search results.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatuses, the method comprising:
    identifying a general search query that does not include a location phrase, wherein a location phrase is one or more terms that specify a geographic location;
    determining, for the general search query, a map query rate based on a ratio of a number of times that the general search query was received through an online map interface presenting the geographic location relative to a total number of times that the general search query was received;
    determining that the general search query is a locally significant query for the geographic location based, at least in part, on the map query rate for the general search query exceeding a threshold value;
    creating a local search query using the general search query and a location phrase representing the geographic location;
    requesting a set of general search results responsive to the general search query and a set of local search results responsive to the local search query;
    selecting, from the set of general search results and the set of local search results, a final set of search results including at least one local search result from the set of local search results and at least one general search result from the set of general search results; and
    providing data that cause presentation of the final set of search results.

2. The method of claim 1, wherein determining that the general search query is a locally significant query for the geographic location further comprises determining that the general search query has been received from user devices associated with the geographic location at least a threshold number of times over a specified period.

3. The method of claim 2, wherein determining that the general search query has been received from user devices associated with the geographic location at least a threshold number of times over a specified period comprises:
    computing a local query count for a reference period, a local query count specifying a number of times that the general search query was received from user devices that are associated with the geographic location;
    computing a local query count for a specified period, the specified period being different than the reference period; and
    comparing the local query count for the specified period to the local query count for the reference period.

4. The method of claim 3, further comprising determining that the local query count for the specific period exceeds an expected query count by at least a threshold amount.

5. The method of claim 2, further comprising determining that the geographic location is associated with a user device based on a geographic identifier that specifies a geographic region for the user device.

6. The method of claim 1, wherein creating a local search query using a general search query and a location phrase representing the geographic location comprises:
- selecting, from a set of locally significant search queries for the geographic location, a locally significant search query that matches the general search query; and
- creating a local search query that includes the selected locally significant search query and the location phrase.

7. The method of claim 1, wherein selecting a final set of search results comprises:
- selecting a pre-specified quantity of general search results to be presented in an available quantity of presentation positions of a search results page; and
- selecting local search results to be presented in a remaining quantity of presentation positions of the search results page.

8. The method of claim 1, wherein selecting a final set of search results comprises selecting, for inclusion in the final set of search results, local search results that have at least a minimum threshold click-through-rate when presented in response to the local search query.

9. The method of claim 1, wherein selecting a final set of search results comprises:
- selecting, for inclusion in the final set of search results, general search results having result scores that exceed a result score threshold, wherein the result score threshold represents a minimum result score required for a search result to be presented in an initial search results page;
- selecting, for inclusion in the final set of search results, a local search result that has a result score for the local search query that is higher than a result score for a general search result that has been selected to be included in the final set of search results; and
- removing, from the final set of search results, a general search result having a lowest result score.

10. The method of claim 1, wherein selecting a final set of search results comprises:
- selecting, for inclusion in the final set of search results, a first quantity of highest ranking general search results;
- selecting, for inclusion in the final set of search results, a second quantity of highest ranking local search results; and
- selecting a presentation order for selected search results, the presentation order being selected according to result scores for the selected search results.

11. The method of claim 1, wherein the location phrase is selected from a set of location phrases including a city and a zip code.

12. A system, comprising:
- a data store storing a set of general search queries that were submitted through a map interface, the general search queries being search queries that do not include a location phrase specifying a geographic location;
- one or more data processing apparatuses that interact with the data store and perform operations comprising:
  - identifying, for one of the general search queries, a map query rate based on a ratio of a number of times that the general search query was received through an online map interface presenting the geographic location relative to a total number of times that the general search query was received;
  - determining that the general search query is a locally significant query for the geographic location based, at least in part, on the map query rate for the general search query exceeding a threshold value;
  - creating a local search query using the general search query and a location phrase representing the geographic location;
  - identifying a set of general search results responsive to the general search query and a set of local search results responsive to the local search query;
  - selecting, from the set of general search results and the set of local search results, a final set of search results including at least one local search result from the set of local search results and at least one general search result from the set of general search results; and
  - providing data that cause presentation of the final set of search results.

13. The system of claim 12, wherein determining that the general search query is a locally significant query for the geographic location further comprises determining that the general search query has been received from user devices associated with the geographic location at least a threshold number of times over a specified period.

14. The system of claim 12, wherein the one or more data processing apparatuses perform operations comprising determining that the geographic location is associated with a user device based on a geographic identifier that specifies a geographic region for the user device.

15. The system of claim 12, wherein selecting a final set of search results comprises selecting for inclusion in the final set of search results, local search results that have at least a minimum threshold click-through-rate.

16. The system of claim 12, wherein selecting a final set of search results comprises:
- selecting, for inclusion in the final set of search results, general search results having result scores that exceed a result score threshold, wherein the result score threshold represents a minimum result score required for a search result to be presented in an initial search results page;
- selecting, for inclusion in the final set of search results, a local search result that has a result score for the local search query that is higher than a result score for a general search result that has been selected to be included in the final set of search results; and
- removing, from the final set of search results, a general search result having a lowest result score.

17. The system of claim 12, further comprising a user device that is configured to interact with the one or more data processing apparatuses to provide the general search query and present the final set of search results using the data provided by the one or more data processing apparatuses.

* * * * *